Figure 13:
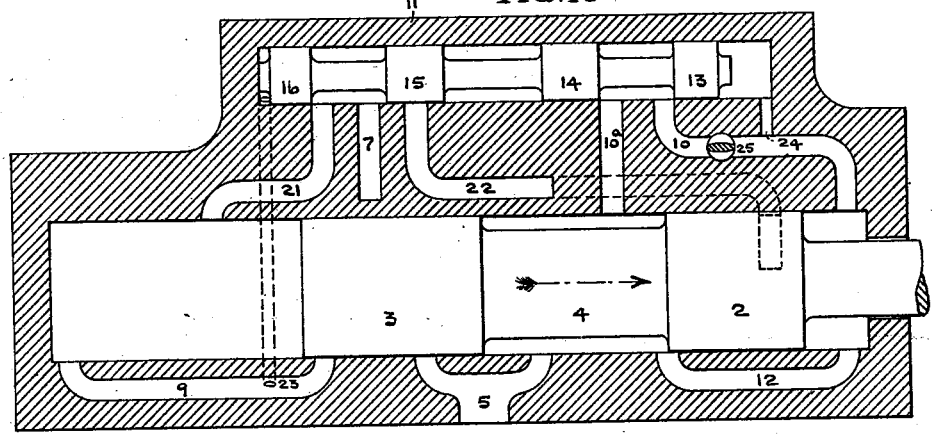

(No Model.)  5 Sheets—Sheet 1.
T. H. PHILLIPS.
IMPACT TOOL.
No. 561,030.  Patented May 26, 1896.
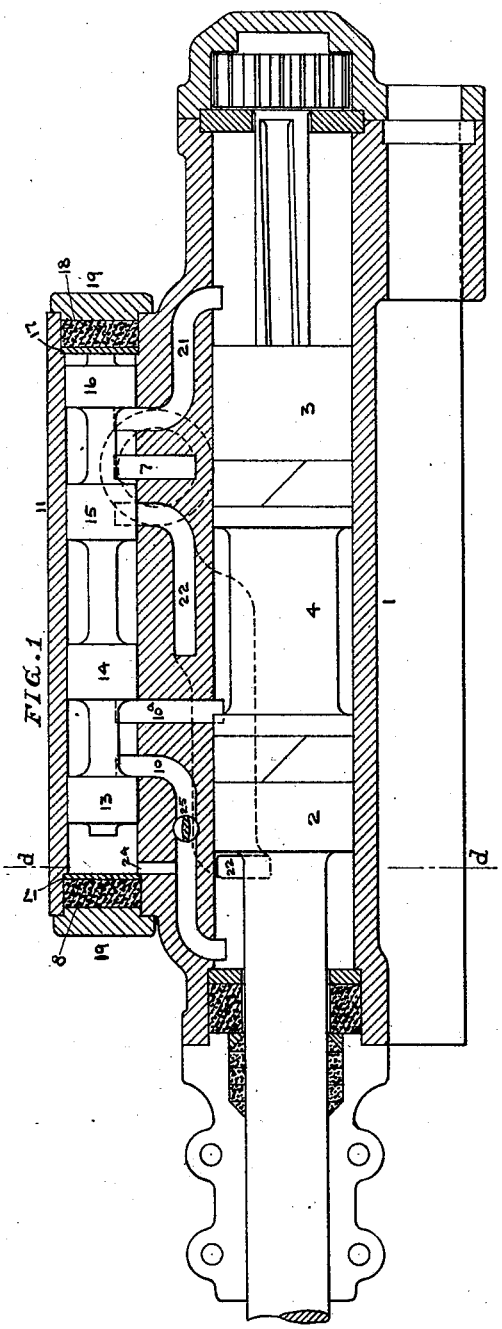
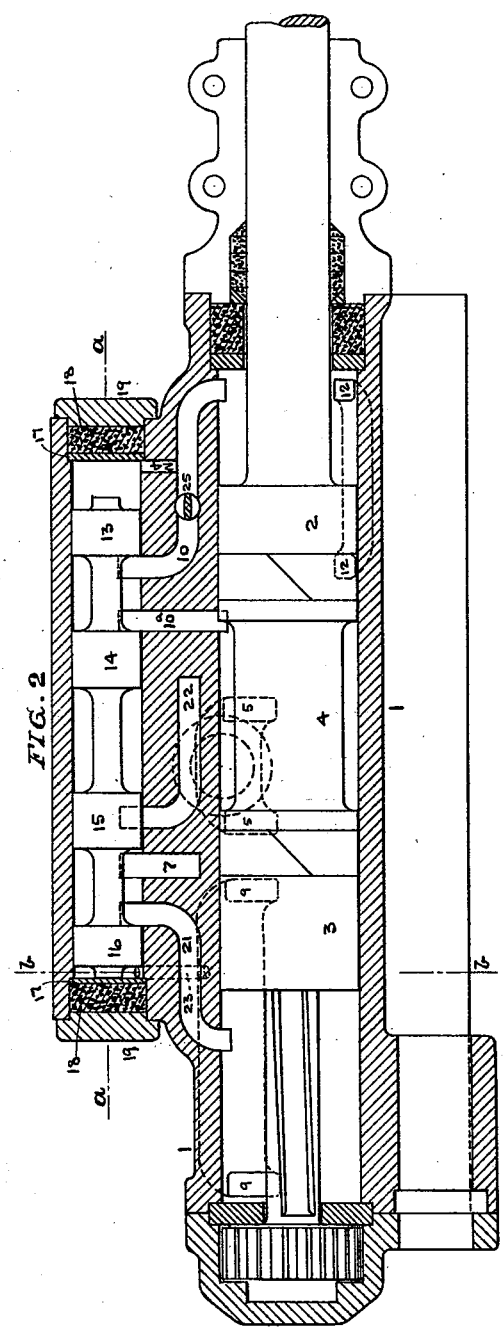
WITNESSES:
Charles De Cou
Frank E. Bechtold
INVENTOR
Thomas H. Phillips
BY
Howson & Howson
ATTORNEYS (No Model.) 5 Sheets—Sheet 2.
T. H. PHILLIPS.
IMPACT TOOL.
No. 561,030. Patented May 26, 1896.
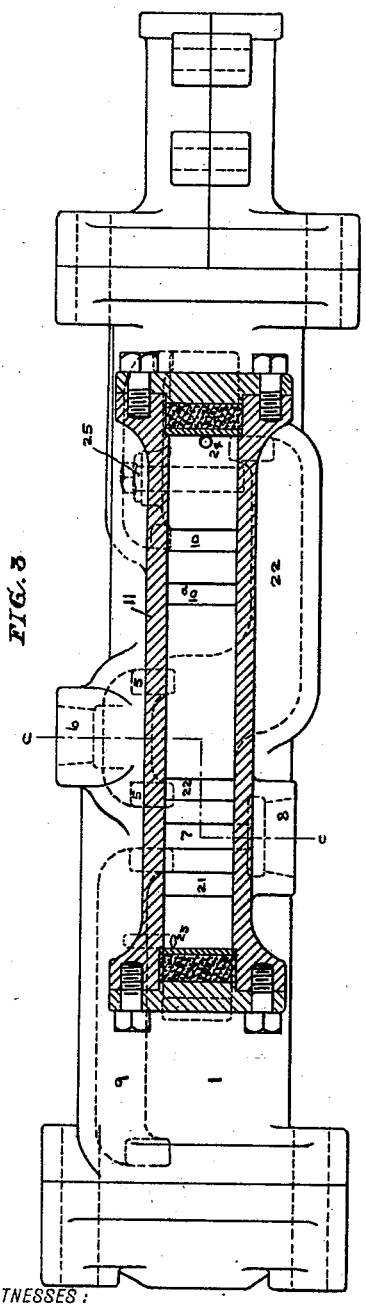
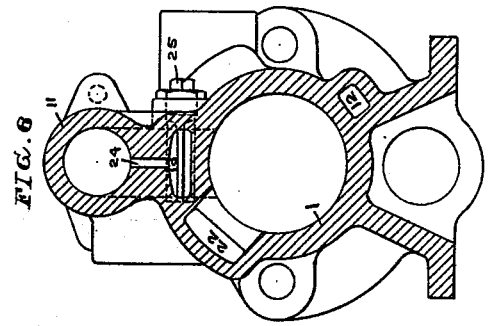
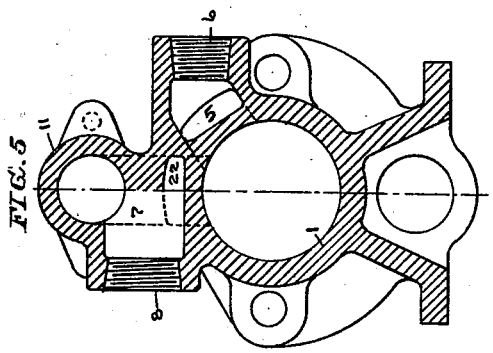
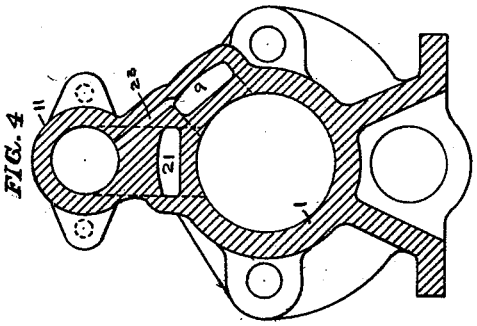
WITNESSES:
Charles De Cou.
Frank E. Bechtold.
INVENTOR
Thomas H. Phillips
BY
Howson & Howson
ATTORNEYS (No Model.) 5 Sheets—Sheet 3.
T. H. PHILLIPS.
IMPACT TOOL.
No. 561,030. Patented May 26, 1896.
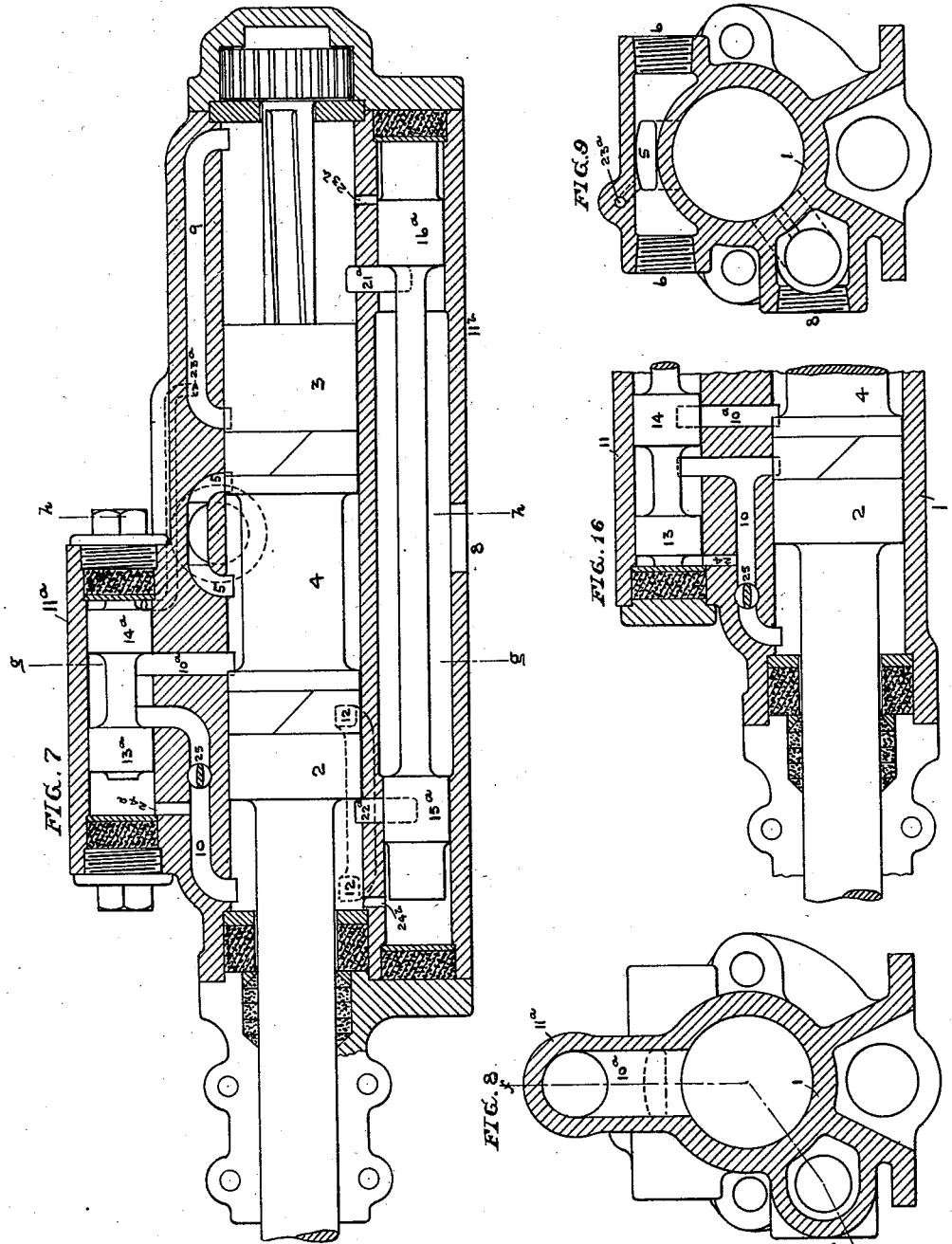
WITNESSES: INVENTOR
Charles De Cou. Thomas H. Phillips
Frank E. Bechtold. BY
Howson & Howson
ATTORNEYS (No Model.) 5 Sheets—Sheet 4.
T. H. PHILLIPS.
IMPACT TOOL.
No. 561,030. Patented May 26, 1896.
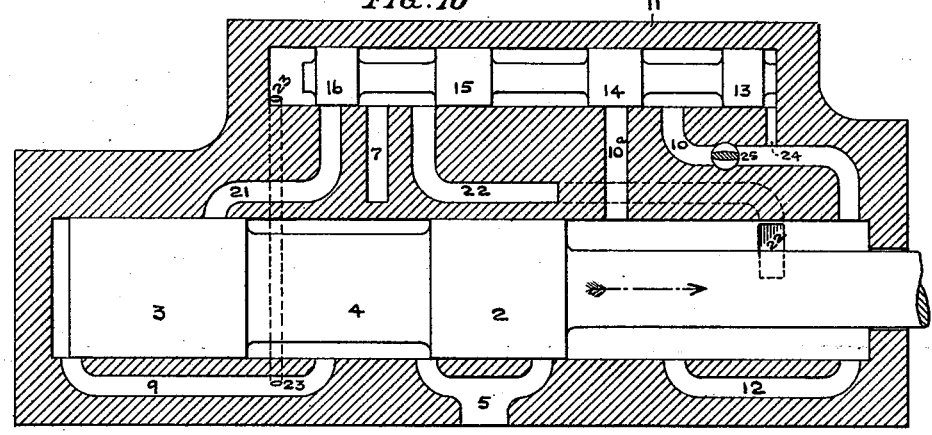
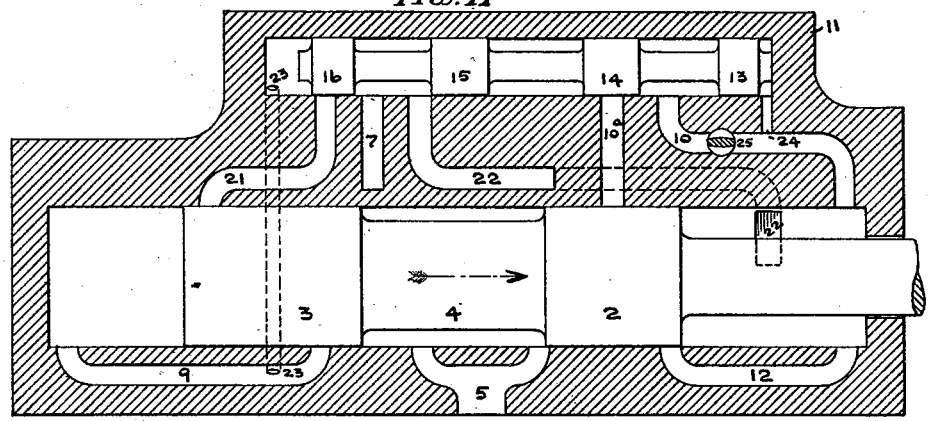
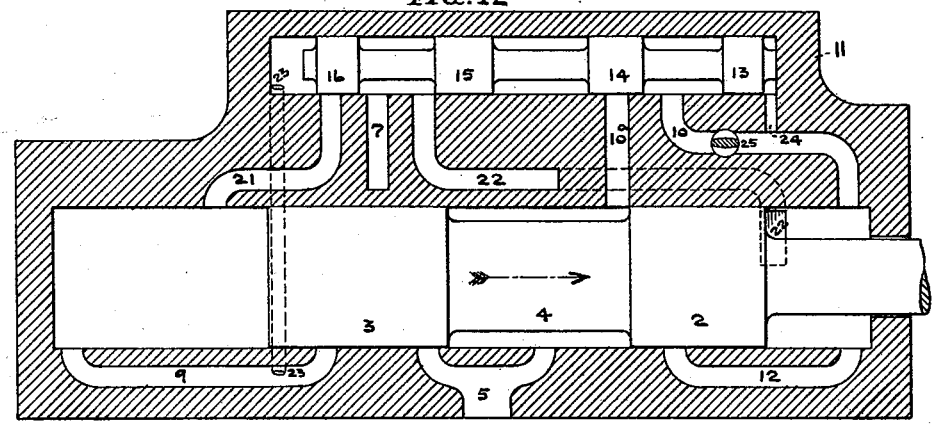
WITNESSES: INVENTOR
Thomas H. Phillips
BY
Howson & Howson
ATTORNEYS (No Model.) 5 Sheets—Sheet 5.

T. H. PHILLIPS.
IMPACT TOOL.

No. 561,030. Patented May 26, 1896.

WITNESSES:
Charles De Cou.
Frank E. Bechtold.

INVENTOR
Thomas H. Phillips
BY
Howson & Howson
ATTORNEYS

UNITED STATES PATENT OFFICE.

THOMAS H. PHILLIPS, OF ST. DAVIDS, PENNSYLVANIA.

IMPACT-TOOL.

SPECIFICATION forming part of Letters Patent No. 561,030, dated May 26, 1896.

Application filed April 1, 1896. Serial No. 585,817. (No model.)

*To all whom it may concern:*

Be it known that I, THOMAS H. PHILLIPS, a citizen of the United States, and a resident of St. Davids, Delaware county, Pennsylvania, have invented certain Improvements in Impact-Tools, of which the following is a specification.

My invention relates to that class of rock-drills or other impact-tools which are operated by steam, compressed air, or other motive fluid acting upon a piston contained in a cylinder and having a rod or stem to which the drill is attached. Machines of this character have to work at all angles between vertically downward and vertically upward, and if the admission and cut-off points of motive fluid are so arranged as to get the best results when the drill is working vertically downward, where the combined weight of the piston, piston-rod, and drill has to be overcome on the back stroke, there will be danger of the piston striking the back head when the machine is used to drill a hole upwardly, the combined weight of the parts mentioned then assisting the backward stroke, while, on the other hand, if the admission and cut-off points for the motive fluid are arranged to get the best results when drilling upwardly there will be a waste of power when drilling holes horizontally or at angles below the horizontal.

One object of my invention is to so construct an impact-tool as to overcome these defects and provide for reducing to a minimum or wholly overcoming the cushioning of the piston on the forward stroke while providing for a proper return of the piston under all circumstances, a further object being to insure a proper cushioning of the piston on the back stroke and the delivery of a blow of maximum force for the amount of motive fluid used, and a still further object of the invention being to attain these results while providing for the fullest measure of expansion of the motive fluid in the cylinder and preventing preliminary cushioning or compression of the residuary motive fluid at either end of the cylinder due to premature closing of the exhaust therefrom. These objects I attain in the manner hereinafter set forth, reference being had to the accompanying drawings, in which—

Figure 1 is a longitudinal section of sufficient of a rock-drill of the character to which my invention relates to illustrate my present invention. Fig. 2 is a similar longitudinal section with the cylinder reversed, so as to show the opposite side of the same from that represented in Fig. 1. Fig. 3 is a plan view of the cylinder, showing the valve-chest in section on the line $a\,a$, Fig. 2, but omitting the valve. Fig. 4 is a transverse section on the line $b\,b$, Fig. 2, omitting both valve and piston. Fig. 5 is a transverse section on the line $c\,c$, Fig. 3, omitting the piston. Fig. 6 is a transverse section on the line $d\,d$, Fig. 1, omitting the valve and piston. Fig. 7 is a longitudinal section on the line $f\,f$, Fig. 8, of a cylinder having a modified construction of valves and ports. Fig. 8 is a transverse section on the line $g\,g$, Fig. 7, omitting the valves and piston. Fig. 9 is a transverse section on the line $h\,h$, Fig. 7, likewise omitting the valves and piston. Figs. 10 to 15 are diagrams illustrative of the operation of the tool shown in Figs. 1 and 2, and Fig. 16 is a sectional view illustrating a further modification of the invention.

The cylinder 1 has at the front end the usual split head inclosing a stuffing-box for the piston-rod and retaining in place within the cylinder the buffer for the front end of the piston, the rear end of the cylinder having the usual pawl-controlled ratchet with grooved rod engaging with a nut in the piston, so as to partially turn the latter as it is retracted. As these parts, however, are common in other rock-drills of this class, any further or more specific reference to them here will be unnecessary.

The piston has two heads 2 and 3, separated by a grooved or reduced portion 4, and the cylinder has ports 5 (or it may be a single port) communicating with the inlet 6 for the motive fluid, and a port 7 communicating with the outlet 8. There is also a passage 9 leading from the rear end of the cylinder to a point adjacent to one of the inlet-ports 5, so that the motive fluid can pass directly from the central portion of the cylinder through the grooved portion of the piston and passage 9 to the rear end of the cylinder, the admission of motive fluid to and the cutting off of motive fluid from the rear end of the cylinder being thus controlled entirely by the position of the rear head 3 of the piston in respect to the forward end of the passage 9.

At the forward end of the cylinder is a passage 10, which serves to provide communication between the forward end of the cylinder and a valve-chest 11 at one side of the same, to which chest is fitted, with reasonable snugness, a valve structure comprising four disks 13, 14, 15, and 16, the disks 13 and 14 constituting a valve for controlling the flow of motive fluid to the forward end of the cylinder, and the disks 15 and 16 constituting a valve for controlling the exhaust from both ends of the cylinder. The portion of the valve between the disks 14 and 15 can be left solid, if desired, without interfering with the working or efficiency of the machine.

At each end of the valve-chest is a bufferplate 17, backed by an elastic or semielastic cushion 18, interposed between said bufferplate and the head 19 of the chest, so as to prevent any injurious shock or jar which might result from the contact of the valve structure with a rigid stop at the end of the valve-chest.

From the cylinder to the valve-chest, adjacent to the inner end of the passage 10, leads a passage $10^a$, and communication between the cylinder and the valve-chest is also provided by passages 21 and 22, the passage 21 constituting the exhaust-passage from the rear end of the cylinder and the passage 22 constituting the exhaust-passage from the forward end of the cylinder.

A passage 12, preferably of reduced area as compared with the passages 9, 10, or $10^a$, serves to afford communication between the front end of the cylinder and a point in said cylinder some distance inwardly from said front end, but in advance of the passage $10^a$.

Leading from the passage 9 to the rear end of the valve-chest 11 is a passage 23, while from the passage 10 to the front end of the valve-chest leads a passage 24, and in the passage 10, at a point between the inner end of the same and the passage 24, is a transverse valve or choke-plate 25, which can be so adjusted as to regulate to a nicety the flow of motive fluid through said passage 10.

The operation of the tool will be understood on reference to the diagrams Figs. 10 to 15, Fig. 10 showing the piston in the retracted position and ready for the forward movement. When the piston occupies this position, motive fluid is admitted to the rear end of the cylinder through the port 5, the groove of the piston, and the passage 9, the exhaust-passage 21 being closed by the rear head of the piston and also by the valve-disk 16, the valve being caused to take this position by reason of the admission of motive fluid behind it through the passage 23. The front end of the cylinder and valve-chest are open to the exhaust, owing to the fact that the exhaust-passage 22 from the forward end of the cylinder is uncovered by the valve-disk 15, so that said exhaust-passage is in free communication with the outlet through the port 7, the passage $10^a$ being closed by the valve-disk 14. The first effect of the forward movement of the piston in the cylinder is to cause the forward head of the piston to close the passage $10^a$, and the next effect being to cause the rear head to close the forward end of the passage 9, so as to cut off any further flow of motive fluid to the rear end of the cylinder, the piston continuing to advance, as shown in Figs. 11 and 12, owing to the expansion of the motive fluid in the rear end of the cylinder and to the momentum previously acquired under full pressure, the uncovering of the exhaust-passage 21 by the rear head of the piston having no effect, owing to the fact that said passage still remains closed by the valve-disk 16. The passage $10^a$ is next uncovered by the forward head of the piston, as shown in Fig. 12; but motive fluid cannot yet gain access to the forward end of the cylinder, owing to the fact that the valve-chest end of said passage $10^a$ is still covered by the disk 14 of the valve. The piston, therefore, still continues to move forward, gathering force under the expansive action of the motive fluid until the forward head of the piston uncovers the inner end of the passage 12, the exhaust-passage 22 having just previously been closed by the said forward head of the piston, as shown in Fig. 13, so as to prevent the escape of motive fluid from the front end of the cylinder. Motive fluid is now admitted in limited quantity through the restricted area of the passage 12 to the front end of the cylinder, and passing thence back through the passage 10 reaches the front end of the valve-chest through the passage 24 and causes rearward movement of the valve in said chest, as shown in Fig. 13, so as to open the exhaust from the rear end of the cylinder through the passages 21 and 7, close the passage 22, and open communication between the passages 10 and $10^a$ for the fuller admission of the motive fluid to the front end of the cylinder. Between the time of the uncovering of the inner end of the passage 12, which admits motive fluid to the forward end of the cylinder, and the shifting of the valve there will elapse an interval of time, during which interval the piston is moving forward, accumulating power from the expansive action of the motive fluid in the rear end of the cylinder, until the valve is shifted and the blow is struck. I am thus enabled to get the fullest benefit from the expansion of the motive fluid as well as to obtain a blow in which the cushioning effect is reduced to a minimum. The piston starts quickly on the backward movement, however, owing to the fact that the admission of steam to the front end of the cylinder precedes the opening of the valve instead of following the same, as in other tools which have been devised.

Figure 14:
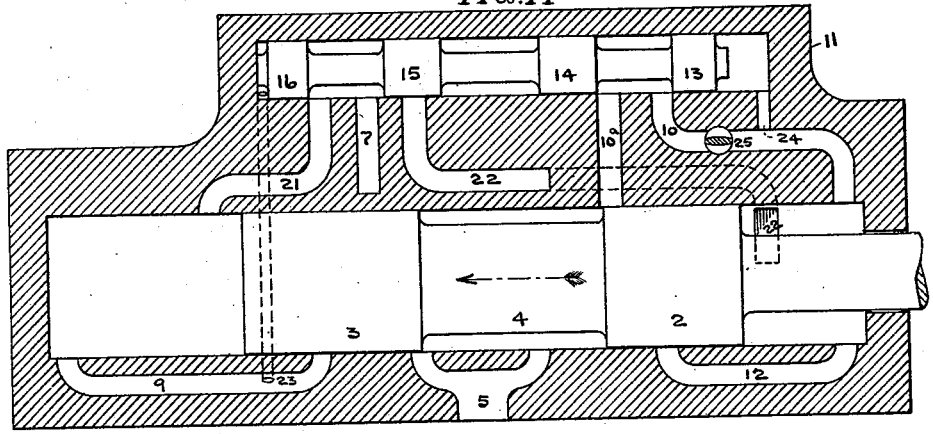
Figure 15:
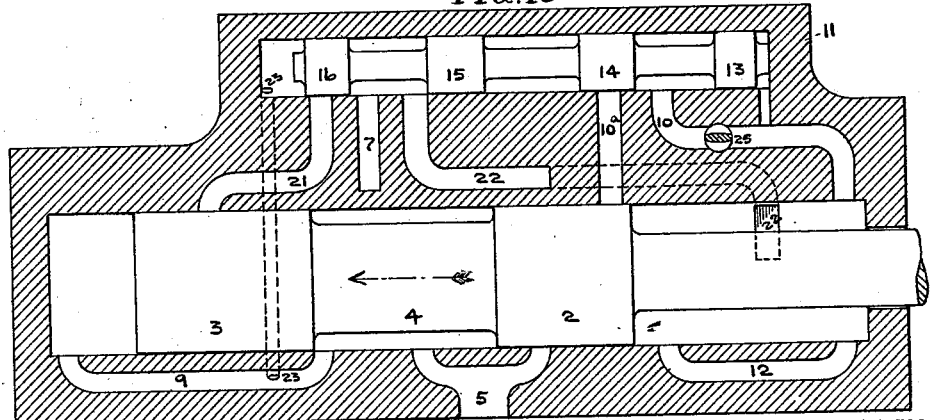

On the backward stroke of the piston motive fluid continues to enter the forward end of the cylinder through the passages $10^a$ and 10 after the inner end of the passage 12 has been closed and until the forward head of the piston in its rearward movement closes the passage $10^a$, as shown in Fig. 14, thus providing for the admission of sufficient motive fluid into the forward end of the cylinder to insure the full return of the piston therein. The motive fluid in the forward end of the cylinder now acts expansively until the inner port of the passage 9 is uncovered by the rear head of the piston, as shown in Fig. 15, motive fluid being thus admitted to the rear end of the cylinder through said passage 9 and to the rear end of the valve-chest through the passage 23, so as to again restore the valve structure to the position shown in Fig. 10 and open the exhaust from the front end of the cylinder through the passages 22 and 7, the rear exhaust-passage 21 having been covered by the piston just previous to the admission of motive fluid to that end of the cylinder. The momentum of the parts carries the piston rearward to the position shown in Fig. 10, the volume of motive fluid in the rear end of the cylinder having a sufficient cushioning effect to prevent contact of the rear head of the piston with the back head of the cylinder.

By the proper use of the valve or choke-plate 25 in the passage 10 I am enabled to regulate to a nicety the volume of motive fluid entering the forward end of the cylinder, so as to increase it when the blow is being delivered downward and decrease it when the blow is being delivered upward, hence avoiding either the cushioning of the blow or the striking of the back head of the cylinder. Measurably the same result may be attained without the use of the valve 25 by changing the valve in the valve-chest 11 so as to provide for only a slight opening or no opening at all of the passage $10^a$ in drilling upwardly, a valve such as shown in the drawings being used in drilling downwardly.

It will be seen that the passage $10^a$ constitutes practically the inner termination of the passage 10, which supplies motive fluid to the front end of the cylinder, the passage being in effect ∩-shaped at the inner end and the valve controlling the flow through the loop of the ∩.

The valve-controlled exhaust-passages are opened and closed in substantially the same way and for the performance of the same function as in the tool shown in my Patent No. 557,084, the exhaust-passages in the present tool being, however, disposed differently from those of the tool shown in my prior patent in order that the exhaust-passages and the front admission-passage may both be controlled by a single valve structure. This construction, however, while preferable is not absolutely essential to the proper carrying out of my invention. For instance, in Fig. 7 I have shown a construction in which the inlet-controlling valve $13^a$ $14^a$ is contained in a chest $11^a$, while the exhaust-controlling valve $15^a$ $16^a$ is contained in a separate and independent chest $11^b$, the exhaust-passages $21^a$ and $22^a$ leading directly from the cylinder to the chest $11^b$, and there being two sets of valve-actuating passages $23^a$ $24^a$ and $23^b$ $24^b$, the former for controlling the movement of the admission-governing valve and the latter for controlling the movement of the exhaust-governing valve.

The valve-controlled forward admission-passage may be used in some cases without a valve for controlling the exhaust, although the use of the latter is of course to be preferred, and it will be evident that ordinary D-valves for controlling, respectively, the admission and exhaust passages may be used in place of the disk valves without departure from the essential features of my invention. The valve structure or structures may also be operated mechanically, if desired, by devices well known in this art, the operation of the valves by the motive fluid from the cylinder being the preferred but not an essentially necessary means for the purpose, nor is it necessary to derive the motive fluid for this purpose from the ports or passages 9 and 10, this source of supply being resorted to because it is the quickest and most direct, and because it maintains a constant communication between each end of the valve-chest and the corresponding end of the cylinder, whereby there is always a preponderance of pressure in one end of the valve-chest or the other and the valve is prevented from dropping by gravity or from being jarred out of proper position.

The passage 10 may communicate at its inner end as well as at its outer end directly with the cylinder, a construction such as shown in Fig. 16 being practicable. In this case the valve 25 is located between the passage 24 and the front end of the passage 10 instead of between the passage 24 and the rear end of said passage 10, as in the other constructions shown, in order that the motive fluid may gain access to the valve-chest for moving the valve without having to first pass the valve 25, there being in this tool, however, as in the tool previously described, an admission of steam to the front end of the cylinder prior to the movement of the valve.

Having thus described my invention, I claim and desire to secure by Letters Patent—

1. An impact-tool in which are combined a cylinder having an inlet for the motive fluid, a valve-chest, a grooved piston reciprocating in the cylinder and communicating with said inlet, a passage leading from the front end of the cylinder to a point some distance inwardly from said front end, another passage leading from the front end of the cylinder to the valve-chest, and thence to the cylinder at a point farther removed from the front end than is the inner termination of the direct passage, and a valve in the valve-chest for controlling the communication through said second passage, substantially as specified.

2. An impact-tool in which are combined a cylinder having an inlet for the motive fluid, a valve-chest, a grooved piston reciprocating in the cylinder and communicating with said inlet, a passage leading from the front end of the cylinder and having separated terminations in the valve-chest and also in the cylinder, a valve for controlling the terminations of the passage in the valve-chest, and a valve or choke-plate for controlling the flow into the front end of the cylinder, independently of said valve in the valve-chest, substantially as specified.

3. An impact-tool in which are combined a cylinder having an inlet for the motive fluid, a valve-chest, a grooved piston reciprocating in the cylinder and communicating with said inlet, a passage leading from the front end of the cylinder to a point some distance inwardly from said front end, another passage leading from the front end of the cylinder to the valve-chest and thence to the cylinder at a point farther removed from the front end than is the inner termination of the direct passage, a valve in the valve-chest for opening and closing communication through said second passage, and a second valve in said passage adjustable so as to regulate the volume of flow therethrough, substantially as specified.

4. An impact-tool in which are combined a cylinder having an inlet for the motive fluid, a valve-chest, a grooved piston reciprocating in the cylinder and communicating with said inlet, a passage leading from the front end of the cylinder to the valve-chest and thence to the cylinder, a passage leading from the rear end of the cylinder to a point therein some distance in advance of the rear end and a valve in the valve-chest for controlling communication through the forward passage, whereby the inlet of motive fluid to the forward end of the cylinder is controlled by the joint action of the piston and valve, and the inlet of motive fluid to the rear end of the cylinder is controlled by the piston only, substantially as specified.

5. An impact-tool in which are combined a cylinder having inlet and outlet for the motive fluid, passages whereby the motive fluid is directed to the ends of the cylinder alternately, a tool-actuating piston adapted to reciprocate in said cylinder, and a pair of valves, one controlling the flow of motive fluid through the forward inlet-passage, and the other controlling the exhaust from both ends of the cylinder, substantially as specified.

6. An impact-tool in which are combined a cylinder having inlet and outlet for the motive fluid, passages whereby the motive fluid is directed to the ends of the cylinder alternately, a tool-actuating piston adapted to reciprocate in said cylinder, and a single valve structure comprising a pair of valves one controlling the flow of motive fluid through the forward inlet-passage and the other controlling the exhaust from both ends of the cylinder, substantially as specified.

7. An impact-tool in which are combined a cylinder having an inlet for the motive fluid, a valve-chest, a grooved piston reciprocating in the cylinder and communicating with said inlet, a passage leading inward from one end of the cylinder and serving to convey motive fluid into said end of the cylinder, a valve structure in the valve-chest, and a passage leading from the end of the valve-chest to the motive-fluid-inlet passage of the cylinder, whereby said end of the valve-chest is in constant communication with its corresponding end of the cylinder, substantially as specified.

8. An impact-tool in which are combined a cylinder having an inlet for the motive fluid, a valve-chest, a grooved piston reciprocating in the cylinder and communicating with said inlet, a passage or passages leading from the front end of the cylinder and having separated terminations in the valve-chest and also in the cylinder, a valve for controlling the terminations of the passage in the valve-chest, and a communication between the front end of the valve-chest, and a motive-fluid-inlet passage whereby said end of the valve-chest is in constant communication with the front end of the cylinder, substantially as specified.

In testimony whereof I have signed my name to this specification in the presence of two subscribing witnesses.

THOMAS H. PHILLIPS.

Witnesses:
WILL. A. BARR,
FRANK E. BECHTOLD.